(12) United States Patent
Schwartz et al.

(10) Patent No.: US 9,274,662 B2
(45) Date of Patent: Mar. 1, 2016

(54) SENSOR MATRIX PAD FOR PERFORMING MULTIPLE CAPACITIVE SENSING TECHNIQUES

(71) Applicant: Synaptics Incorporated, San Jose, CA (US)

(72) Inventors: Adam Schwartz, Redwood City, CA (US); Petr Shepelev, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 39 days.

(21) Appl. No.: 14/178,150

(22) Filed: Feb. 11, 2014

(65) Prior Publication Data

US 2015/0227229 A1 Aug. 13, 2015

Related U.S. Application Data

(60) Provisional application No. 61/893,138, filed on Oct. 18, 2013, provisional application No. 61/893,143, filed on Oct. 18, 2013.

(51) Int. Cl.
*G06F 3/044* (2006.01)
*G06F 3/041* (2006.01)

(52) U.S. Cl.
CPC .............. *G06F 3/044* (2013.01); *G06F 3/0416* (2013.01); *G06F 2203/04106* (2013.01)

(58) Field of Classification Search
CPC .................. G06F 3/044; G06F 3/0416; G06F 2203/04112; G06F 2203/04107
USPC ................................. 345/173, 174
See application file for complete search history.

(56) References Cited

U.S. PATENT DOCUMENTS 4,087,625 A   5/1978   Dym et al.
4,233,522 A   11/1980  Grummer et al.
(Continued)

FOREIGN PATENT DOCUMENTS

CN   2436978 Y   6/2001
CN   1490713 A   4/2004
(Continued)

OTHER PUBLICATIONS

International Search Report; PCT/US2013/021314 dated Jun. 25, 2013.
Quantum Research Group. "Qmatrix Technology White Paper", 2006. 4 Pages.
Lubart, et al. "One Layer Optically Transparent Keyboard for Input Display", IP.com. Mar. 1, 1979. 3 Pages.
Quantum Research Application Note An-KD01. "Qmatrix Panel Design Guidelines", Oct. 10, 2002. 4 Pages.
(Continued)

*Primary Examiner* — Koosha Sharifi-Tafreshi
(74) *Attorney, Agent, or Firm* — Patterson + Sheridan, LLP

(57) ABSTRACT

Embodiments in the present disclosure use various individual electrodes in a capacitive sensing pixel of an electrode matrix to perform two different techniques of capacitive sensing. For example, a capacitive sensing pixel may include at least two sensor electrodes that may be driven different by a processing system depending on the current capacitive technique being used to user interaction. When performing absolute capacitive sensing, a first one of the sensor electrodes may be driven with a modulated signal in order to measure a change in absolute capacitance between the driven sensor electrode and an input object. Alternatively, when performing transcapacitance sensing, the first sensor electrode is driven with a transmitter signal while a resulting signal is measured on a second sensor electrode in the capacitive pixel. In this manner, the individual electrodes in a capacitive sensing pixel may be driven differently depending on the current capacitive sensing technique.

18 Claims, 10 Drawing Sheets

(56) References Cited

U.S. PATENT DOCUMENTS

| | | |
|---|---|---|
| 4,237,421 A | 12/1980 | Waldron |
| 4,264,903 A | 4/1981 | Bigelow |
| 4,293,987 A | 10/1981 | Gottbreht et al. |
| 4,484,026 A | 11/1984 | Thornburg |
| 4,492,958 A | 1/1985 | Minami |
| 4,550,221 A | 10/1985 | Mabusth |
| 4,550,310 A | 10/1985 | Yamaguchi et al. |
| 4,659,874 A | 4/1987 | Landmeier |
| 4,667,259 A | 5/1987 | Uchida et al. |
| 4,677,259 A | 6/1987 | Abe |
| 4,705,919 A | 11/1987 | Dhawan |
| 4,771,138 A | 9/1988 | Dhawan |
| 4,878,013 A | 10/1989 | Andermo |
| 4,954,823 A | 9/1990 | Binstead |
| 4,999,462 A | 3/1991 | Purcell |
| 5,053,715 A | 10/1991 | Andermo |
| 5,062,916 A | 11/1991 | Aufderheide et al. |
| 5,239,307 A | 8/1993 | Andermo |
| 5,341,233 A | 8/1994 | Tomoike et al. |
| 5,459,463 A | 10/1995 | Gruaz et al. |
| 5,463,388 A | 10/1995 | Boie et al. |
| 5,650,597 A | 7/1997 | Redmayne |
| 5,657,012 A | 8/1997 | Tait |
| 5,777,596 A | 7/1998 | Herbert |
| 5,841,078 A | 11/1998 | Miller et al. |
| 5,869,790 A | 2/1999 | Shigetaka et al. |
| 5,914,465 A | 6/1999 | Allen et al. |
| 6,054,979 A | 4/2000 | Sellers |
| 6,188,391 B1 | 2/2001 | Seely et al. |
| 6,222,522 B1 | 4/2001 | Mathews et al. |
| 6,256,022 B1 | 7/2001 | Manaresi et al. |
| 6,281,888 B1 | 8/2001 | Hoffman et al. |
| 6,288,707 B1 | 9/2001 | Philipp |
| 6,297,811 B1 | 10/2001 | Kent et al. |
| 6,307,751 B1 | 10/2001 | Bodony et al. |
| 6,320,394 B1 | 11/2001 | Tartagni |
| 6,362,633 B1 | 3/2002 | Tartagni |
| 6,380,930 B1 | 4/2002 | Van Ruymbeke |
| 6,452,514 B1 | 9/2002 | Philipp |
| 6,459,044 B2 | 10/2002 | Watanabe et al. |
| 6,486,862 B1 | 11/2002 | Jacobsen et al. |
| 6,512,381 B2 | 1/2003 | Kramer |
| 6,535,200 B2 | 3/2003 | Philipp |
| 6,583,632 B2 | 6/2003 | Von Basse et al. |
| 6,653,736 B2 | 11/2003 | Kishimoto et al. |
| 6,731,120 B2 | 5/2004 | Tartagni |
| 6,771,327 B2 | 8/2004 | Sekiguchi |
| 6,825,833 B2 | 11/2004 | Mulligan et al. |
| 6,879,930 B2 | 4/2005 | Sinclair et al. |
| 6,910,634 B1 | 6/2005 | Inose et al. |
| 6,937,031 B2 | 8/2005 | Yoshioka et al. |
| 6,998,855 B2 | 2/2006 | Tartagni |
| 7,129,935 B2 | 10/2006 | Mackey |
| 7,158,125 B2 | 1/2007 | Sinclair et al. |
| 7,218,314 B2 | 5/2007 | Itoh |
| 7,306,144 B2 | 12/2007 | Moore |
| 7,327,352 B2 | 2/2008 | Keefer et al. |
| 7,339,579 B2 | 3/2008 | Richter et al. |
| 7,348,967 B2 | 3/2008 | Zadesky et al. |
| 7,382,139 B2 | 6/2008 | Mackey |
| 7,388,571 B2 | 6/2008 | Lowles et al. |
| 7,423,219 B2 | 9/2008 | Kawaguchi et al. |
| 7,423,635 B2 | 9/2008 | Taylor et al. |
| 7,439,962 B2 | 10/2008 | Reynolds et al. |
| 7,455,529 B2 | 11/2008 | Fujii et al. |
| 7,522,230 B2 | 4/2009 | Lee |
| 7,548,073 B2 | 6/2009 | Mackey et al. |
| 7,554,531 B2 | 6/2009 | Baker et al. |
| 7,589,713 B2 | 9/2009 | Sato |
| 7,663,607 B2 | 2/2010 | Hotelling et al. |
| 7,724,243 B2 | 5/2010 | Geaghan |
| 7,768,273 B1 | 8/2010 | Kalnitsky et al. |
| 7,786,981 B2 | 8/2010 | Proctor |
| 7,808,255 B2 | 10/2010 | Hristov et al. |
| 7,812,825 B2 | 10/2010 | Sinclair et al. |
| 7,821,274 B2 | 10/2010 | Philipp et al. |
| 7,821,502 B2 | 10/2010 | Hristov |
| 7,859,521 B2 | 12/2010 | Hotelling et al. |
| 7,864,160 B2 | 1/2011 | Geaghan et al. |
| 7,868,874 B2 | 1/2011 | Reynolds |
| 7,876,309 B2 | 1/2011 | XiaoPing |
| 7,973,771 B2 | 7/2011 | Geaghan |
| 7,977,953 B2 | 7/2011 | Lee |
| 7,986,152 B2 | 7/2011 | Philipp et al. |
| 8,040,326 B2 | 10/2011 | Hotelling et al. |
| 8,059,015 B2 | 11/2011 | Hua et al. |
| 8,125,463 B2 | 2/2012 | Hotelling et al. |
| 8,169,568 B2 | 5/2012 | Kim |
| 8,243,027 B2 | 8/2012 | Hotelling et al. |
| 8,258,986 B2 | 9/2012 | Makovetskyy |
| 8,259,078 B2 | 9/2012 | Hotelling et al. |
| 8,278,571 B2 | 10/2012 | Orsley |
| 8,305,359 B2 | 11/2012 | Bolender et al. |
| 8,319,747 B2 | 11/2012 | Hotelling et al. |
| 2002/0077313 A1 | 6/2002 | Clayman |
| 2003/0052867 A1 | 3/2003 | Shigetaka et al. |
| 2003/0103043 A1 | 6/2003 | Mulligan et al. |
| 2003/0234771 A1 | 12/2003 | Mulligan et al. |
| 2004/0062012 A1 | 4/2004 | Murohara |
| 2004/0077313 A1 | 4/2004 | Oba et al. |
| 2004/0125087 A1 | 7/2004 | Taylor et al. |
| 2004/0222974 A1 | 11/2004 | Hong et al. |
| 2004/0239650 A1 | 12/2004 | Mackey |
| 2004/0252109 A1 | 12/2004 | Trent et al. |
| 2005/0030048 A1 | 2/2005 | Bolender et al. |
| 2006/0007171 A1* | 1/2006 | Burdi et al. ............. 345/173 |
| 2006/0038754 A1 | 2/2006 | Kim |
| 2006/0097991 A1 | 5/2006 | Hotelling et al. |
| 2006/0114240 A1 | 6/2006 | Lin |
| 2006/0114241 A1 | 6/2006 | Lin |
| 2006/0232600 A1 | 10/2006 | Kimura et al. |
| 2007/0008299 A1 | 1/2007 | Hristov |
| 2007/0222762 A1 | 9/2007 | Van Delden et al. |
| 2007/0229466 A1 | 10/2007 | Peng et al. |
| 2007/0229468 A1 | 10/2007 | Peng et al. |
| 2007/0229469 A1 | 10/2007 | Seguine |
| 2007/0229470 A1 | 10/2007 | Snyder et al. |
| 2007/0242054 A1 | 10/2007 | Chang et al. |
| 2007/0257894 A1 | 11/2007 | Philipp |
| 2007/0262962 A1 | 11/2007 | XiaoPing et al. |
| 2007/0262963 A1 | 11/2007 | Xiao-Ping et al. |
| 2007/0268265 A1 | 11/2007 | XiaoPing |
| 2007/0273659 A1 | 11/2007 | XiaoPing et al. |
| 2007/0273660 A1 | 11/2007 | XiaoPing |
| 2007/0279395 A1 | 12/2007 | Philipp et al. |
| 2007/0291009 A1 | 12/2007 | Wright et al. |
| 2008/0006453 A1 | 1/2008 | Hotelling |
| 2008/0007534 A1 | 1/2008 | Peng et al. |
| 2008/0062140 A1 | 3/2008 | Hotelling et al. |
| 2008/0062147 A1 | 3/2008 | Hotelling et al. |
| 2008/0074398 A1 | 3/2008 | Wright |
| 2008/0111795 A1 | 5/2008 | Bollinger |
| 2008/0117182 A1 | 5/2008 | Um et al. |
| 2008/0150906 A1 | 6/2008 | Grivna |
| 2008/0158172 A1 | 7/2008 | Hotelling et al. |
| 2008/0158181 A1 | 7/2008 | Hamblin et al. |
| 2008/0164076 A1 | 7/2008 | Orsley |
| 2008/0218488 A1 | 9/2008 | Yang et al. |
| 2008/0245582 A1 | 10/2008 | Bytheway |
| 2008/0246723 A1 | 10/2008 | Baumbach |
| 2008/0259044 A1 | 10/2008 | Utsunomiya et al. |
| 2008/0264699 A1 | 10/2008 | Chang et al. |
| 2008/0265914 A1 | 10/2008 | Matsushima |
| 2008/0297176 A1 | 12/2008 | Douglas |
| 2008/0308323 A1 | 12/2008 | Huang et al. |
| 2008/0309635 A1 | 12/2008 | Matsuo |
| 2009/0002337 A1 | 1/2009 | Chang |
| 2009/0002338 A1 | 1/2009 | Kinoshita et al. |
| 2009/0033343 A1* | 2/2009 | Reynolds et al. ............. 324/688 |
| 2009/0040191 A1 | 2/2009 | Tong et al. |
| 2009/0046077 A1 | 2/2009 | Tanaka et al. |
| 2009/0091551 A1 | 4/2009 | Hotelling et al. |
| 2009/0096757 A1 | 4/2009 | Hotelling et al. |
| 2009/0107737 A1 | 4/2009 | Reynolds et al. |

(56) References Cited

U.S. PATENT DOCUMENTS

| | | |
|---|---|---|
| 2009/0128518 A1 | 5/2009 | Kinoshita et al. |
| 2009/0135151 A1 | 5/2009 | Sun |
| 2009/0153509 A1 | 6/2009 | Jiang et al. |
| 2009/0160682 A1 | 6/2009 | Bolender et al. |
| 2009/0185100 A1 | 7/2009 | Matsuhira et al. |
| 2009/0201267 A1 | 8/2009 | Akimoto et al. |
| 2009/0207154 A1 | 8/2009 | Chino |
| 2009/0213082 A1 | 8/2009 | Ku |
| 2009/0213534 A1 | 8/2009 | Sakai |
| 2009/0236151 A1 | 9/2009 | Yeh et al. |
| 2009/0262096 A1 | 10/2009 | Teramoto |
| 2009/0267916 A1 | 10/2009 | Hotelling |
| 2009/0273571 A1 | 11/2009 | Bowens |
| 2009/0273573 A1 | 11/2009 | Hotelling |
| 2009/0277695 A1 | 11/2009 | Liu et al. |
| 2009/0283340 A1 | 11/2009 | Liu et al. |
| 2009/0303203 A1 | 12/2009 | Yilmaz et al. |
| 2009/0309850 A1 | 12/2009 | Yang |
| 2009/0314621 A1 | 12/2009 | Hotelling |
| 2009/0324621 A1 | 12/2009 | Senter et al. |
| 2010/0001966 A1 | 1/2010 | Lii et al. |
| 2010/0001973 A1 | 1/2010 | Hotelling et al. |
| 2010/0006347 A1 | 1/2010 | Yang |
| 2010/0013745 A1 | 1/2010 | Kim et al. |
| 2010/0013800 A1 | 1/2010 | Elias et al. |
| 2010/0044122 A1 | 2/2010 | Sleeman et al. |
| 2010/0090979 A1 | 4/2010 | Bae |
| 2010/0134422 A1 | 6/2010 | Borras |
| 2010/0140359 A1 | 6/2010 | Hamm et al. |
| 2010/0144391 A1 | 6/2010 | Chang et al. |
| 2010/0147600 A1 | 6/2010 | Orsley |
| 2010/0149108 A1 | 6/2010 | Hotelling et al. |
| 2010/0156839 A1 | 6/2010 | Ellis |
| 2010/0163394 A1 | 7/2010 | Tang et al. |
| 2010/0182273 A1 | 7/2010 | Noguchi et al. |
| 2010/0188359 A1 | 7/2010 | Lee |
| 2010/0193257 A1 | 8/2010 | Hotelling et al. |
| 2010/0194695 A1 | 8/2010 | Hotelling et al. |
| 2010/0194697 A1 | 8/2010 | Hotelling et al. |
| 2010/0214247 A1 | 8/2010 | Tang et al. |
| 2010/0220075 A1 | 9/2010 | Kuo et al. |
| 2010/0258360 A1 | 10/2010 | Yilmaz |
| 2010/0265210 A1 | 10/2010 | Nakanishi et al. |
| 2010/0271330 A1 | 10/2010 | Philipp |
| 2010/0277433 A1 | 11/2010 | Lee et al. |
| 2010/0289770 A1 | 11/2010 | Lee et al. |
| 2010/0291973 A1 | 11/2010 | Nakahara et al. |
| 2010/0292945 A1* | 11/2010 | Reynolds et al. ............... 702/65 |
| 2010/0302201 A1 | 12/2010 | Ritter et al. |
| 2010/0321043 A1 | 12/2010 | Philipp et al. |
| 2010/0321326 A1 | 12/2010 | Grunthaner et al. |
| 2011/0006999 A1 | 1/2011 | Chang et al. |
| 2011/0007030 A1 | 1/2011 | Mo et al. |
| 2011/0018841 A1 | 1/2011 | Hristov |
| 2011/0022351 A1 | 1/2011 | Philipp et al. |
| 2011/0025635 A1 | 2/2011 | Lee |
| 2011/0025639 A1 | 2/2011 | Trend et al. |
| 2011/0048812 A1 | 3/2011 | Yilmaz |
| 2011/0048813 A1 | 3/2011 | Yilmaz |
| 2011/0057887 A1 | 3/2011 | Lin et al. |
| 2011/0062969 A1 | 3/2011 | Hargreaves et al. |
| 2011/0062971 A1 | 3/2011 | Badaye |
| 2011/0063251 A1 | 3/2011 | Geaghan et al. |
| 2011/0080357 A1 | 4/2011 | Park et al. |
| 2011/0090159 A1 | 4/2011 | Kurashima |
| 2011/0096016 A1 | 4/2011 | Yilmaz |
| 2011/0109579 A1 | 5/2011 | Wang et al. |
| 2011/0109590 A1 | 5/2011 | Park |
| 2011/0141051 A1 | 6/2011 | Ryu |
| 2011/0169770 A1 | 7/2011 | Mishina et al. |
| 2011/0187666 A1 | 8/2011 | Min |
| 2011/0210941 A1* | 9/2011 | Reynolds et al. ............ 345/174 |
| 2011/0242444 A1 | 10/2011 | Song |
| 2011/0248949 A1 | 10/2011 | Chang et al. |
| 2011/0267300 A1 | 11/2011 | Serban et al. |
| 2011/0273391 A1 | 11/2011 | Bae |
| 2011/0298746 A1 | 12/2011 | Hotelling |
| 2012/0038585 A1 | 2/2012 | Kim |
| 2012/0044171 A1 | 2/2012 | Lee et al. |
| 2012/0056820 A1 | 3/2012 | Corbridge |
| 2012/0218199 A1 | 8/2012 | Kim et al. |
| 2012/0313901 A1 | 12/2012 | Monson |
| 2013/0057507 A1 | 3/2013 | Shin et al. |
| 2013/0088372 A1 | 4/2013 | Lundstrum et al. |
| 2013/0162570 A1 | 6/2013 | Shin et al. |
| 2013/0215075 A1 | 8/2013 | Lee et al. |
| 2013/0321296 A1 | 12/2013 | Lee et al. |

FOREIGN PATENT DOCUMENTS

| | | |
|---|---|---|
| EP | 0810540 A2 | 12/1997 |
| EP | 0919945 A2 | 6/1999 |
| EP | 0977159 A1 | 2/2000 |
| JP | 2002-215330 A | 8/2002 |
| JP | 2002-268768 A | 9/2002 |
| JP | 2002268786 A | 9/2002 |
| JP | 2011002947 A | 1/2011 |
| JP | 2011002948 A | 1/2011 |
| JP | 2011002949 A | 1/2011 |
| JP | 2011002950 A | 1/2011 |
| JP | 2011004076 A | 1/2011 |
| JP | 2011100379 A | 5/2011 |
| KR | 10110118065 | 1/2012 |
| WO | WO-86/06551 A1 | 11/1986 |
| WO | WO-0057344 A1 | 9/2000 |
| WO | WO-2010117946 A2 | 10/2010 |
| WO | WO-20100136932 A1 | 12/2010 |

OTHER PUBLICATIONS

Calvin Wang et al. "Single Side All-Point-Addressable Clear Glass Substrate Sensor Design", IP.com. Apr. 2, 2009. 3 Pages.

Tsz-Kin Ho et al. "32.3: Simple Single-Layer Multi-Touch Projected Capacitive Touch Panel", SID 09 Digest.

Johannes Schoning et al. "Multi-Touch Surfaces: A Technical Guide", Technical Report TUM-I0833. 2008.

Shawn Day. "Low Cost Touch Sensor on the Underside of a Casing", IP.com. Oct. 14, 2004.

Ken Gilleo, "The Definitive History of the Printed Circuit", 1999 PC Fab.

Hal Philipp. "Charge Transfer Sensing", vol. 19, No. 2. 1999. pp. 96-105.

Paul Leopardi, "A Partition of the Unit Sphere into Regions of Equal Area and Small Diameter", 2005.

Olivier Bau, "TeslaTouch: Electrovibration for Touch Surfaces", 2010.

Colin Holland. "SID: Single Layer Technology Boosts Capacitive Touchscreens", www.eetimes.com/General. 2011.

"Novel Single Layer Touchscreen Based on Indium", 2011.

"Mesh Patterns for Capacitive Touch or Proximity Sensors", IP.com. May 14, 2010. 3pages.

"IDT Claims World's First True Single-Layer Multi-Touch Projected Capacitive Touch Screen Technology", EE Times Europe. Dec. 8, 2010.

Tracy V. Wilson et al. "How the iPhone Works", HowStuffWorks "Multi-touch Systems". 2011.

Sunkook Kim et al. "A Highly Sensitive Capacitive Touch Sensor Integrated on a Thin-Film-Encapsulated Active-Matrix OLED for Ultrathin Displays", IEEE Transactions on Electron Devices, vol. 58, No. 10, Oct. 2011.

Mike Williams, "Dream Screens from Graphene", Technology Developed at Rice could Revolutionize Touch-Screen Displays. Aug. 2011.

ASIC Packaging Guidebook, Toshiba Corporation. (2000). 35 pages.

Fujitsu Microelectronics Limited. "IC Package." (2002). 10 pages.

Gary L. Barrett et al. "Projected Capacitive Touch Technology", "Touch Technology Information Display", www.informationaldisplay.org, Mar. 2010 vol. 26 No. 3, pp. 16-21.

Ken Gilleo. "The Circuit Centennial", Apr. 28, 2003, Total of 7 pages.

* cited by examiner

| | EXAMPLE A | EXAMPLE B | EXAMPLE C | EXAMPLE D | EXAMPLE F |
|---|---|---|---|---|---|
| SENSOR ELECTRODE 305 | ABS | GUARD | ABS | FLOAT | ABS |
| SENSOR ELECTRODE 310 | GUARD | ABS | FLOAT | ABS | ABS |
| SENSOR ELECTRODE 315 | C.V./FLOAT | C.V./FLOAT | C.V./FLOAT | C.V./FLOAT | C.V./FLOAT |

ABSOLUTE CAPACITIVE SENSING

TRANSCAPACITIVE SENSING

| | EXAMPLE G | EXAMPLE H | EXAMPLE I | EXAMPLE J | EXAMPLE K | EXAMPLE L |
|---|---|---|---|---|---|---|
| SENSOR ELECTRODE 305 | TX/RX | TX/RX | TX/RX | TX/RX | FLOAT | C.V. |
| SENSOR ELECTRODE 310 | TX/RX | TX/RX | FLOAT | C.V. | TX/RX | TX/RX |
| SENSOR ELECTRODE 315 | C.V. | FLOAT | TX/RX | TX/RX | TX/RX | TX/RX |

FIG. 4C

SIMULTANEUS ABSOLUTE AND TRANSCAPACITIVE SENSING

| | EXAMPLE M | EXAMPLE N |
|---|---|---|
| SENSOR ELECTRODE 305 | TX | ABS AND RX |
| SENSOR ELECTRODE 310 | ABS AND RX | TX |
| SENSOR ELECTRODE 315 | C.V./FLOAT | C.V./FLOAT |

FIG. 4D

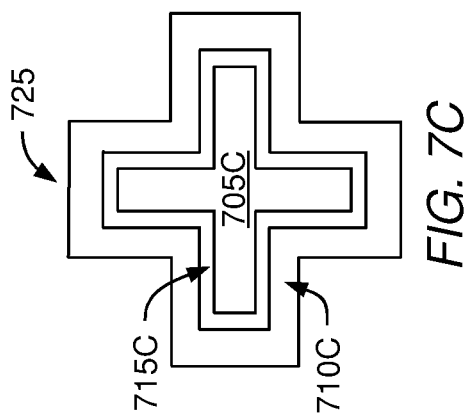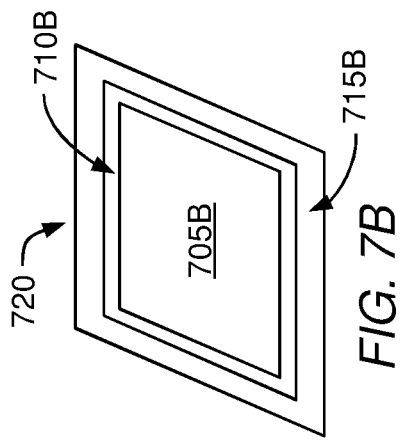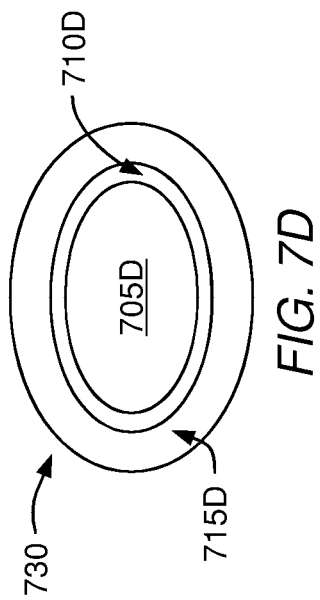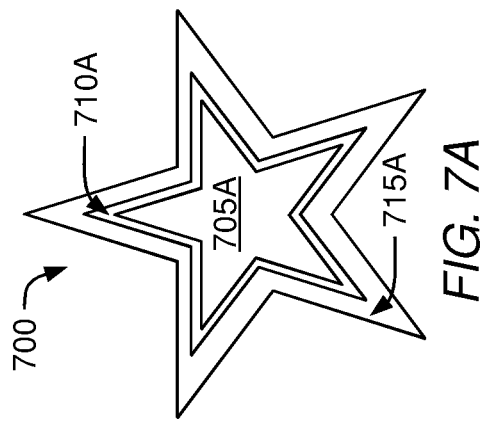

SENSOR MATRIX PAD FOR PERFORMING MULTIPLE CAPACITIVE SENSING TECHNIQUES

This application claims the benefit of U.S. Provisional Patent Application Ser. No. 61/893,143, filed Oct. 18, 2013, and U.S. Provisional Patent Application Ser. No. 61/893,138, filed Oct. 18, 2013.

BACKGROUND OF THE INVENTION

1. Field of the Invention

Embodiments of the present invention generally relate to performing capacitive sensing using the same sensor electrode in two different modes of operation.

2. Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY OF THE INVENTION

One embodiment described herein is an input device that includes a display device, a plurality of sensor electrodes that establish a sensing region of the input device, and a processing system coupled to the plurality of sensor electrodes. The processing system is configured to perform absolute capacitive sensing during a first time period by driving a modulated signal on at least one of a first sensor electrode of the plurality of sensor electrodes and a second sensor electrode of the plurality of sensor electrodes to determine a change in absolute capacitance between the driven sensor electrode and an input object. Moreover, the first and second sensor electrodes are disposed on a same plane in the input device. The processing system is also configured to perform transcapacitance sensing during a second time period by driving a transmitter signal onto the first sensor electrode and measuring a resulting signal on the second sensor electrode.

Another embodiment described herein is a method for performing capacitive sensing comprising a plurality of sensor electrodes that establish a sensing region of the input device. The method includes performing absolute capacitive sensing during a first time period by driving a modulated signal on at least one of a first sensor electrode of the plurality of sensor electrodes and a second sensor electrode of the plurality of sensor electrodes to determine a change in absolute capacitance between the driven sensor electrode and an input object. Moreover, the first and second sensor electrodes are disposed on a same plane in the display device. The method also includes performing transcapacitance sensing during a second time period by driving a transmitter signal onto the first sensor electrode and measuring a resulting signal on the second sensor electrode.

Another embodiment described herein is a processing system for a capacitive sensing device comprising a sensing region. The processing system includes a sensor module coupled to a plurality of sensor electrodes, the sensor module configured to perform a first mode of capacitive sensing during a first time period by driving a modulated signal on at least one of a first sensor electrode of the plurality of sensor electrodes and a second sensor electrode of the plurality of sensor electrodes and perform a second, different mode of capacitive sensing during a second time period using at least one of the first and second sensor electrodes. In addition, the second sensor electrode at least partially encircles the first sensor electrode.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 4A illustrates a capacitive pixel that may be used in the input device of FIG. 1, according to one embodiment described herein.

FIGS. 4B-4D illustrate various capacitive sensing modes using the capacitive pixel, according to one embodiment described herein.

FIGS. 7A-7D illustrate various shapes of capacitive sensing pixels, according to one embodiment described herein.

Figure 1:
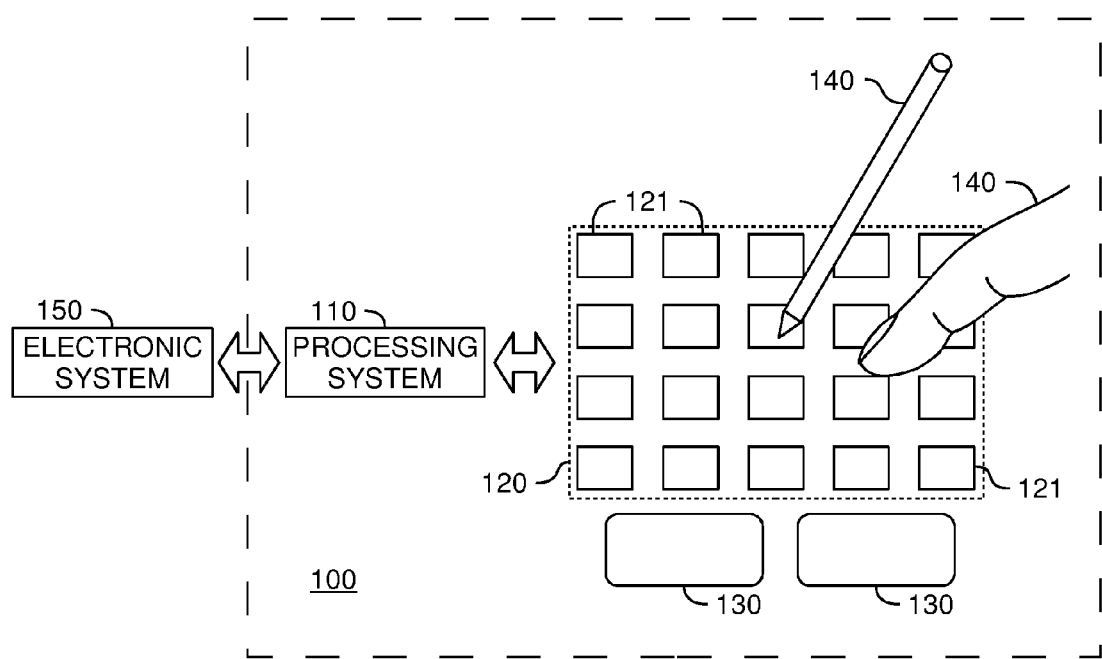
FIG. 1 is a schematic block diagram of an exemplary input device, according to an embodiment described herein.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present technology provide input devices and methods for improving usability. Specifically, the various individual electrodes in a capacitive sensing pixel of an electrode matrix may be used to perform two different techniques of capacitive sensing. In one example, a capacitive sensing pixel may include at least two sensor electrodes are driven differently by a processing system depending on the current capacitive sensing technique being employed. For instance, when performing absolute capacitive sensing, a first one of the sensor electrodes in the capacitive pixel may be driven with a modulated signal in order to measure a change in absolute capacitance between the driven sensor electrode and an input object. A second one of the sensor electrodes may be driven using a guarding signal or left electrically floating. Alternatively, when performing transcapacitance sensing, the first sensor electrode is driven with a transmitter signal while a resulting signal is measured on the second sensor electrode. In this manner, the individual electrodes in a capacitive sensing pixel may be driven differently depending on the current capacitive sensing technique.

The electrode matrix may include a plurality of capacitive sensing pixels arranged in a grid. In one embodiment, the capacitive sensing pixels may be disposed on the same plane in the input device. The capacitive pixels, for example, may be arranged on the same plane in rows and columns that are either aligned or staggered (e.g., adjacent sensing pixels may be offset). The individual electrodes in the capacitive sensing pixels are not limited to any particular shape, but in one embodiment, the individual electrodes may form concentric shapes where one sensor electrode at least partially encircles one or more of the other electrodes. Furthermore, in one embodiment, the capacitive sensing pixels may be interleaved such that at least one row and column of sensing pixels has an edge overlapping with an edge of an adjacent row or column of sensing pixels.

FIG. 1 is a block diagram of an exemplary input device 100, in accordance with embodiments of the present technology. Although embodiments of the present disclosure may be utilized in an input device 100 including a display device integrated with a sensing device, it is contemplated that the invention may be embodied in display devices without integrated sensing devices. The input device 100 may be configured to provide input to an electronic system 150. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, behind, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements 121 for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements 121 pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements 121 to create electric fields. In some capacitive implementations, separate sensing elements 121 may be ohmically shorted together to form larger sensor electrodes. Some capacitive implementations utilize resistive sheets, which may be uniformly resistive. Although not shown, the sensing elements 121 may be capacitive sensing pixels that include one or more sensor or other electrodes.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. The change in capacitive coupling may be between sensor electrodes in two different sensing elements 121 or between two different sensor electrodes in the same sensing element 121. In various embodiments, an input object near the sensor electrodes alters the electric field between the sensor electrodes, thus changing the measured capacitive coupling. In one implementation, a transcapacitance sensing method operates by detecting the capacitive coupling between one or more transmitter sensor electrodes (also "transmitter electrodes") and one or more receiver sensor electrodes (also "receiver electrodes"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitter electrodes or receiver electrodes, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. (For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) 121 of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen of the display device 101. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), electrowetting, MEMS, or other display technology. The input device 100 and the display device 101 may share physical elements. For example, some embodiments may utilize some of the same electrical components for displaying and sensing. As another example, the display device 101 may be operated in part or in total by the processing system 110.

It should be understood that while many embodiments of the present technology are described in the context of a fully functioning apparatus, the mechanisms of the present technology are capable of being distributed as a program product (e.g., software) in a variety of forms. For example, the mechanisms of the present technology may be implemented and distributed as a software program on information bearing media that are readable by electronic processors (e.g., non-transitory computer-readable and/or recordable/writable information bearing media readable by the processing system 110). Additionally, the embodiments of the present technology apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
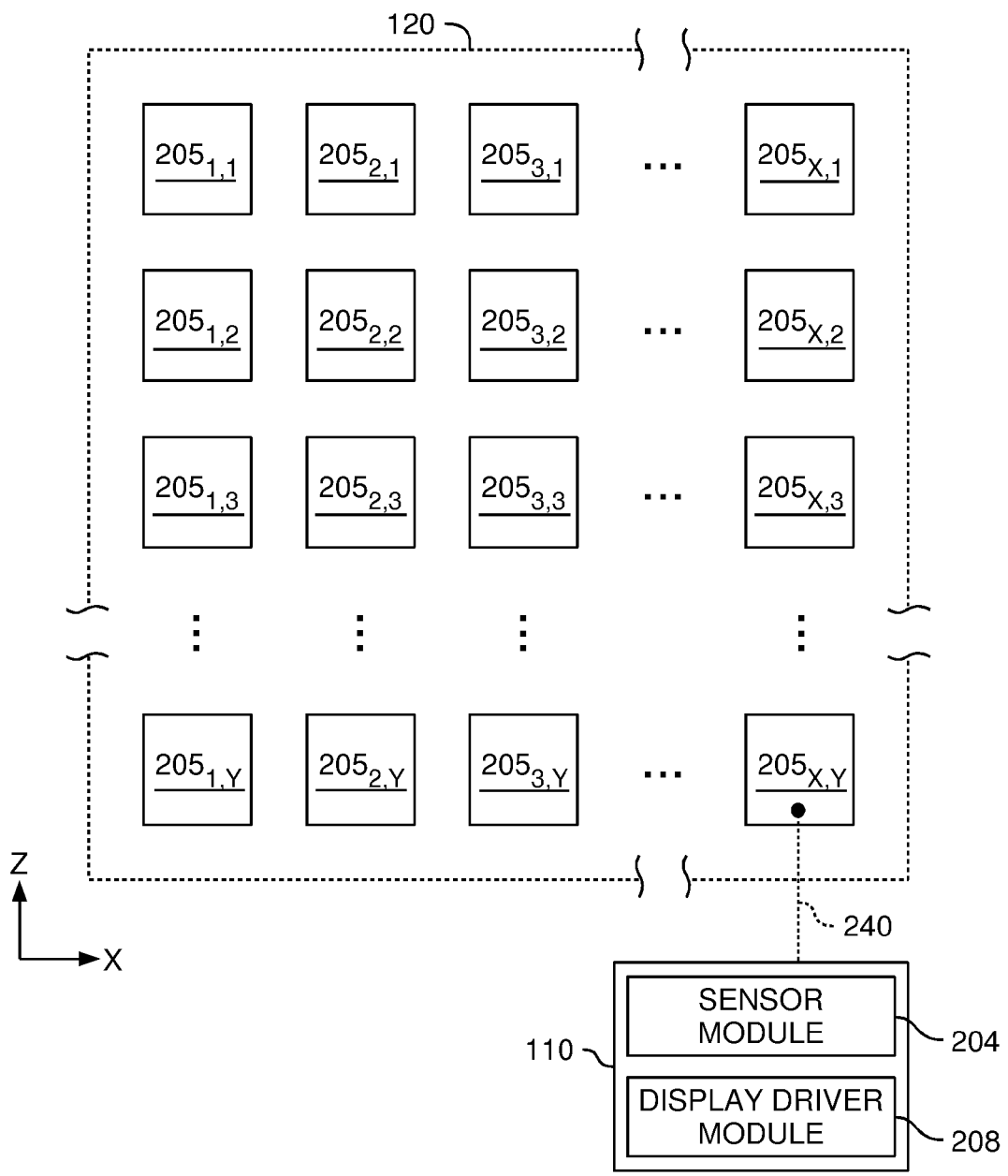
FIG. 2 illustrates a simplified exemplary array of sensor elements that may be used in the input device of FIG. 1, according to one embodiment described herein.

FIG. 2 shows a portion of an exemplary pattern of capacitive sensing pixels 205 (also referred to herein as capacitive pixels or sensing pixels) configured to sense in the sensing region 120 associated with a pattern, according to some embodiments. Each capacitive pixel 205 may include one of more of the sensing elements described above. For clarity of illustration and description, FIG. 2 presents the regions of the capacitive pixels 205 in a pattern of simple rectangles and does not show various other components within the capacitive pixels 205. In one embodiment, the capacitive sensing pixels 205 are areas of localized capacitance (capacitive coupling). Capacitive pixels 205 may be formed between an individual sensor electrode and ground in a first mode of operation and between groups of sensor electrodes used as transmitter and receiver electrodes in a second mode of operation. The capacitive coupling changes with the proximity and motion of input objects in the sensing region 120 associated with the capacitive pixels 205, and thus may be used as an indicator of the presence of the input object in the sensing region 120 of the input device.

The exemplary pattern comprises an array of capacitive sensing pixels $205_{X,Y}$ (referred collectively as pixels 205) arranged in X columns and Y rows, wherein X and Y are positive integers, although one of X and Y may be zero. It is contemplated that the pattern of sensing pixels 205 may comprises a plurality of sensing pixels 205 having other configurations, such as polar arrays, repeating patterns, non-repeating patterns, non-uniform arrays a single row or column, or other suitable arrangement. Further, as will be discussed in more detail below, the sensor electrodes in the sensing pixels 205 may be any shape such as circular, rectangular, diamond, star, square, nonconvex, convex, nonconcave concave, etc. As shown here, the sensing pixels 205 are coupled to the processing system 110 and utilized to determine the presence (or lack thereof) of an input object in the sensing region 120.

In a first mode of operation, at least one sensor electrode within the capacitive sensing pixels 205 may be utilized to detect the presence of an input object via absolute sensing techniques. A sensor module 204 in processing system 110 is configured to drive a sensor electrode in each pixel 205 with a modulated signal and measure a capacitance between the sensor electrode and the input object (e.g., free space or earth ground) based on the modulated signal, which is utilized by the processing system 110 or other processor to determine the position of the input object.

The various electrodes of capacitive pixels 205 are typically ohmically isolated from the electrodes of other capacitive pixels 205. Additionally, where a pixel 205 includes multiple electrodes, there electrodes may be ohmically isolated from each other. That is, one or more insulators separate the sensor electrodes and prevent them from electrically shorting to each other.

In a second mode of operation, sensor electrodes in the capacitive pixels 205 are utilized to detect the presence of an input object via transcapacitance sensing techniques. That is, processing system 110 may drive at least one sensor electrode in a pixel 205 with a transmitter signal and receive resulting signals using one or more of the other sensor electrodes in the pixel 205, where a resulting signal comprising effects corresponding to the transmitter signal. The resulting signal is utilized by the processing system 110 or other processor to determine the position of the input object.

The input device 100 may be configured to operate in any one of the modes described above. The input device 100 may also be configured to switch between any two or more of the modes described above.

In some embodiments, the capacitive pixels 205 are "scanned" to determine these capacitive couplings. That is, in one embodiment, one or more of the sensor electrodes are driven to transmit transmitter signals. Transmitters may be operated such that one transmitter electrode transmits at one time, or multiple transmitter electrodes transmit at the same time. Where multiple transmitter electrodes transmit simultaneously, the multiple transmitter electrodes may transmit the same transmitter signal and effectively produce an effectively larger transmitter electrode. Alternatively, the multiple transmitter electrodes may transmit different transmitter signals. For example, multiple transmitter electrodes may transmit different transmitter signals according to one or more coding schemes that enable their combined effects on the resulting signals of receiver electrodes to be independently determined.

The sensor electrodes configured as receiver sensor electrodes may be operated singly or multiply to acquire resulting signals. The resulting signals may be used to determine measurements of the capacitive couplings at the capacitive pixels 205.

In other embodiments, "scanning" pixels 205 to determine these capacitive coupling includes driving with a modulated signal and measuring the absolute capacitance of one or more of the sensor electrodes. In another embodiment, the sensor electrodes may be operated such that the modulated signal is driven on a sensor electrode in multiple capacitive pixels 205 at the same time. In such embodiments, an absolute capacitive measurement may be obtained from each of the one or more pixels 205 simultaneously. In one embodiment, the input device 100 simultaneously drives a sensor electrode in a plurality of capacitive pixels 205 and measures an absolute capacitive measurement for each of the pixels 205 in the same sensing cycle. In various embodiments, processing system 110 may configured to selectively drive and receive with a portion of sensor electrodes. For example, the sensor electrodes may be selected based on, but not limited to, an application running on the host processor, a status of the input device, an operating mode of the sensing device and a determined location of an input device.

A set of measurements from the capacitive pixels 205 form a "capacitive image" (also "capacitive frame") representative of the capacitive couplings at the pixels 205. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

In some embodiments, one or more of the sensor electrodes in the capacitive pixels 205 include one or more display electrodes used in updating the display of the display screen. In one or more embodiment, the display electrodes comprise one or more segments of a Vcom electrode (common electrodes), a source drive line, gate line, an anode electrode or cathode electrode, or any other display element. These display electrodes may be disposed on an appropriate display screen substrate. For example, the common electrodes may be disposed on the a transparent substrate (a glass substrate, TFT glass, or any other transparent material) in some display screens (e.g., In Plane Switching (IPS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), etc. In such embodiments, the common electrode can also be referred to as a "combination electrode", since it performs multiple functions. In various embodiments, each of the sensor electrodes comprises one or more common electrodes. In other embodiments, at least two sensor electrodes may share at least one common electrode.

Continuing to refer to FIG. 2, the processing system 110 coupled to the sensing electrodes includes a sensor module 204 and optionally, a display driver module 208. In one embodiment the sensor module comprises circuitry configured to drive a transmitter signal or a modulated signal onto and receive resulting signals with the resulting signals the sensing electrodes during periods in which input sensing is desired. In one embodiment the sensor module 204 includes a transmitter module including circuitry configured to drive a transmitter signal onto the sensing electrodes during periods in which input sensing is desired. The transmitter signal is generally modulated and contains one or more bursts over a period of time allocated for input sensing. The transmitter signal may have an amplitude, frequency and voltage which may be changed to obtain more robust location information of the input object in the sensing region. The modulated signal used in absolute capacitive sensing may be the same or different from the transmitter signal used in transcapacitance sensing. The sensor module 204 may be selectively coupled to one or more of the sensor electrodes in the capacitive pixels 205. For example, the sensor module 204 may be coupled to selected portions of the sensor electrodes and operate in either an absolute or transcapacitance sensing mode. In another example, the sensor module 204 may be coupled to a different sensor electrodes when operating in the absolute sensing mode than when operating in the transcapacitance sensing mode.

In various embodiments the sensor module 204 may comprise a receiver module that includes circuitry configured to receive a resulting signal with the sensing electrodes comprising effects corresponding to the transmitter signal during periods in which input sensing is desired. In one or more embodiments, the receiver module is configured to drive a modulated signal onto a first sensor electrode in one of the pixels 205 and receive a resulting signal corresponding to the modulated signal to determine changes in absolute capacitance of the sensor electrode. The receiver module may determine a position of the input object in the sensing region 120 or may provide a signal including information indicative of the resulting signal to another module or processor, for example, a determination module or a processor of the electronic device (i.e., a host processor), for determining the position of the input object in the sensing region 120. In one or more embodiments, the receiver module comprises a plurality of receivers, where each receiver may be an analog front ends (AFEs).

In one or more embodiments, capacitive sensing (or input sensing) and display updating may occur during at least partially overlapping periods. For example, as a common electrode is driven for display updating, the common electrode (or another sensor electrode in a separate region not being used to update the display) may also be driven for capacitive sensing. Or overlapping capacitive sensing and display updating may include modulating the reference voltage(s) of the display device and/or modulating at least one display electrode for a display in a time period that at least partially overlaps with when the sensor electrodes are configured for capacitive sensing. In another embodiment, capacitive sensing and display updating may occur during non-overlapping periods, also referred to as non-display update periods. In various embodiments, the non-display update periods may occur between display line update periods for two display lines of a display frame and may be at least as long in time as the display update period. In such embodiment, the non-display update period may be referred to as a long horizontal blanking period, long h-blanking period or a distributed blanking period. In other embodiments, the non-display update period may comprise horizontal blanking periods and vertical blanking periods. Processing system 110 may be configured to drive sensor electrodes 120 for capacitive sensing during any one or more of or any combination of the different non-display update times.

The display driver module 208 includes circuitry confirmed to provide display image update information to the display of the display device 160 during display updating periods. The display driver module 208 may be included with or separate from the sensor module 204. In one embodiment, the processing system comprises a first integrated controller comprising the display driver module 208 and at least a portion of the sensor module 204 (i.e., transmitter module and/or receiver module). In another embodiment, the processing system comprises a first integrated controller comprising the display driver 208 and a second integrated controller comprising the sensor module 204. In yet another embodiment, the processing system comprises a first integrated controller comprising a display driver module 208 and one of a transmitter module or a receiver module and a second integrated controller comprising the other one of the transmitter module and receiver module.

Figure 3:
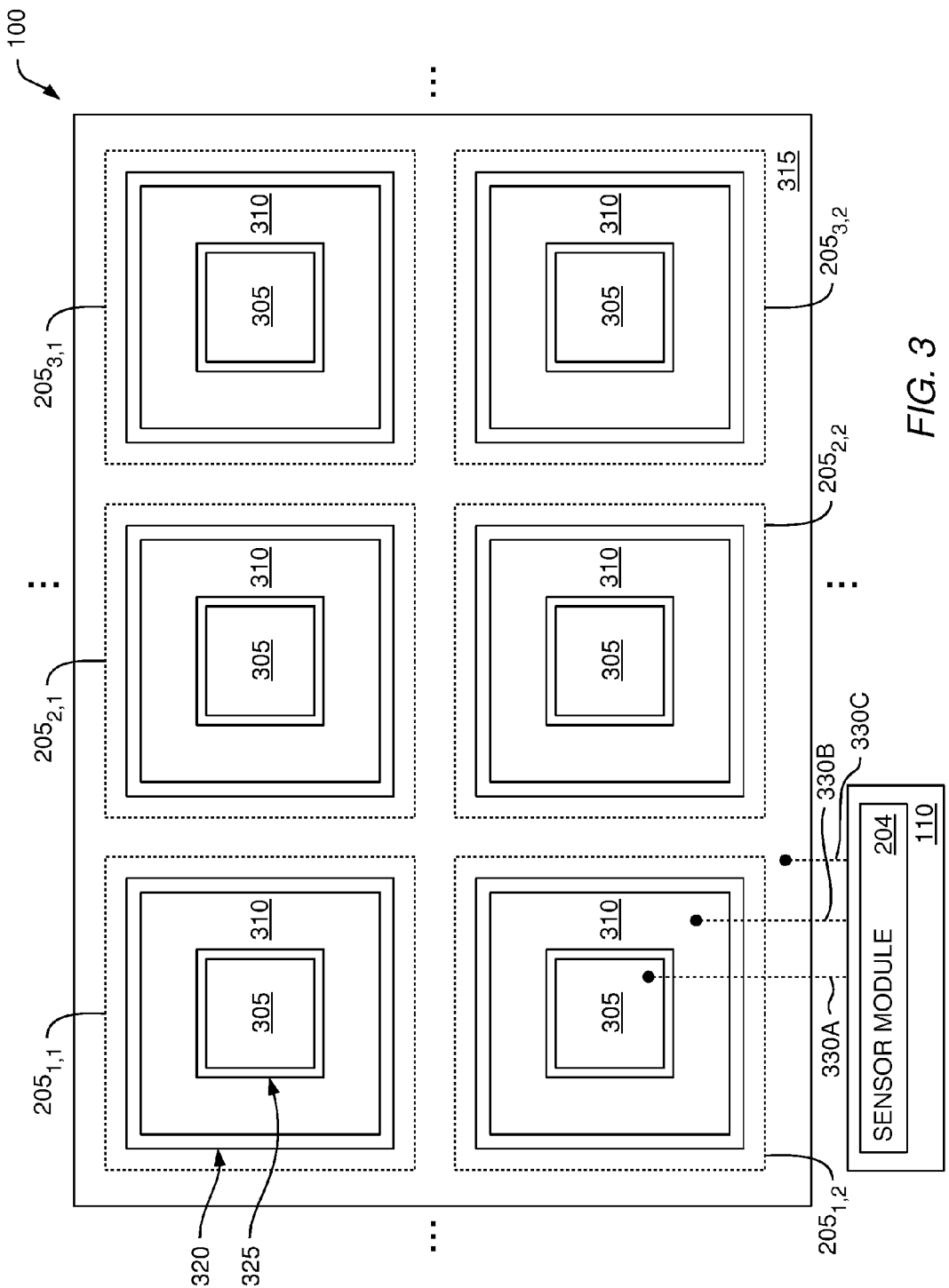
FIG. 3 illustrates an array of sensor electrodes, according to one embodiment described herein.

FIG. 3 illustrates an array of sensor electrodes, according to one embodiment described herein. As stated above, the capacitive sensing pixels 205 are respective portions of a capacitive sensing region that include one or more sensor electrodes. FIG. 3 illustrates one example arrangement of the various electrodes contained within a capacitive sensing pixel 205. In input device 100, the various electrodes forming the capacitive pixels 205 are disposed along the same plane. For instance, the electrodes 305, 310, and 315 may be disposed on the same substrate within the input device. In another embodiment, the sensor electrodes 305, 310, and/or 315 may be on different planes. For example, sensor electrode 305 may be on a first plane while sensor electrode 310 is on a second plane (e.g., two different layers of a stack or two different sides of a common substrate). In this example, the insulating spacer 325 may be omitted because the electrodes 305, 310 are insulated by a vertical spacer e.g., a dielectric substrate that separates the two sensor electrodes 305, 310. Furthermore, if sensor electrode 305 is disposed on a layer above sensor electrode 310, electrode 310 may have a middle cutout region that is smaller than sensor electrode 305 (i.e., sensor electrode 305 at least partially overlaps sensor electrode 310). In another example, if sensor electrode 315 is disposed on a separate layer than sensor electrodes 305 and 310, electrode 315 may have cutout regions that are smaller than sensor electrode 310 or sensor electrode 305. That is, sensor electrode 310 may at least partially overlap sensor electrode 315, and if the cutout region is further shrunk, sensor electrode 305 may also at least partially overlaps sensor electrode 315. In one embodiment, sensor electrode 315 may be a single electrode sheet that is overlapped by the sensor electrodes 305 and 310 which are disposed on a separate layer. In another embodiment, each sensor electrode 305, 310, and 315 may be on separate layers when sensor electrodes 310 do not include any respective middle cutout regions and sensor electrode 315 also does not have cutout regions (i.e., is a single electrode sheet).

At least one of the electrodes in the pixels 205 encircles or partially encircles another electrode (e.g., surrounds an electrode on at least two sides). As shown, sensor electrode 310 completely surrounds sensor electrode 305 while sensor electrode 315 completely surrounds both sensor electrodes 305 and 310. The sensor module 204 may include an independent connection 330 to each of the sensors electrodes 305 and 310 in each of the capacitive pixels 205 (for clarity, only the connections 330A-C to capacitive sensing pixel 205$_{1,2}$ are shown). In one embodiment, the sensor electrodes 305 and 310 may be concentric but this is not a requirement. Moreover, although electrode 315 is shown here as a single electrode, in other embodiments, this electrode 315 may include a plurality of different segments that are driven in the same manner. If so, the sensor module 204 may have respective connections to one or more of these segments in order to control at least a portion of the sensor electrode 315 during capacitive sensing. Furthermore, in device 100, the capacitive pixels 205 include two sensor electrodes 305 and 310 (and part of sensor electrode 315) but the present disclosure is not limited to such. In other embodiments, the pixels 205 may include additional sensor electrodes that may completely encircles, or partially encircles, one of the sensor electrodes 305, 310 (e.g., another concentric right). In one embodiment, the shape of the sensor electrodes 305, 310 is determined based on an area of the sensor electrode and the spatial interpolation of the response from this electrode. Moreover, the optical properties of the sensor electrode may be considered when the electrode is integrated into a display device. For example, the boundaries of the sensor electrodes 305, 310 may be aligned with the boundaries of the display pixels.

Moreover, the processing system 110 may include a display driver module (not shown) that is independently connected to the various electrodes 305, 310, and 315 to drive signals onto the electrodes for updating a display. In one embodiment, the display driver module may use the same connections 330 to the sensor electrodes 305, 310, 315 used by the sensor module 204—e.g., the connections 330 are multiplexed—but this is not a requirement.

Because the sensor electrodes 305, 310, and 315 may be located on the same plane, the capacitive pixel 205 includes dielectric spacers 320 and 325 that ohmically insulate adjacent electrodes. That is, dielectric spacer 320 electrically insulates sensor electrodes 310 and 315 while spacer 325 insulates sensor electrodes 305 and 310. The dielectric spacers 320 and 325 may be formed from an insulative material deposited onto a substrate (e.g., silicon dioxide) or may be an air-gap in the substrate.

Using the sensor electrodes 305, 310, and 315, the processing system 110 can perform different capacitive techniques—e.g., absolute capacitive sensing or transcapacitance sensing—using the same electrode layout. As will be explained in greater detail below, the sensor electrodes 305, 310, and 315, however, may be used differently depending on the capacitive sensing technique currently being employed. For example, the sensor electrodes 305, 310, and 315 used to carry a sensing signal or a shielding signal may vary depending on the sensing technique used. In one embodiment, the shielding signal is modulated to form a guarding signal. Furthermore, these same electrodes may also be used for updating a display (e.g., the sensor electrodes 305, 310, and 315 may be used to generate a Vcom layer).

As discussed above, the sensor electrodes 305, 310, and 315 may be formed as discrete geometric forms, polygons, bars, pads, lines or other shape, which are ohmically isolated from one another. The sensor electrodes 305, 310, and 315 may be electrically coupled through circuitry to form electrodes having larger plan area relative to a discrete one of the sensor electrodes 305, 310, and 315. The sensor electrodes 305, 310, and 315 may be fabricated from opaque or non-opaque conductive materials. In embodiments wherein the sensor electrodes 305, 310, and 315 are utilized with a display device, it may be desirable to utilize non-opaque conductive materials for the sensor electrodes 305, 310, and 315. In embodiments where the sensor electrodes 305, 310, and 315 are not utilized with a display device, it may be desirable to utilize opaque conductive materials having lower resistivity for the sensor electrodes 305, 310, and 315 to improve sensor performance. Materials suitable for fabricating the sensor electrodes 305, 310, and 315 include ITO, aluminum, silver, copper, metal-mesh, and conductive carbon materials, among others.

Figures 4A, 4B:
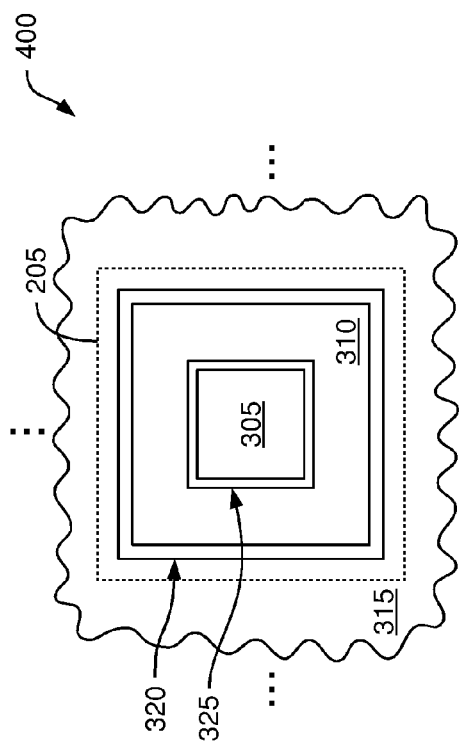

FIG. 4A illustrates a capacitive pixel that may be used in the input device of FIG. 1, according to one embodiment described herein. Specifically, FIG. 4A illustrates a portion 400 of a sensing region that includes the capacitive sensing pixel 205. The charts 405, 410, and 415 in FIGS. 4B-4D illustrate different techniques for driving the sensor electrodes 305, 310, and 315 in the pixel 205 for performing capacitive sensing.

Chart 405 of FIG. 4B illustrates various examples of driving the sensor electrodes 305, 310, and 315 when performing absolute sensing—i.e., measuring a change in capacitive between an electrode driven using the modulated signal and an input object. In Example A, the sensor module drives the modulated signal suitable for absolute capacitive sensing (referred to in FIG. 4 as signal "ABS") onto the center electrode 305 while a guarding signal is driven onto the sensor electrode 310. In one embodiment, the guarding signal may be equal to the modulated signal ABS in at least one of amplitude, shape, phase and/or frequency. For example, the guarding signal may have the same shape and frequency as the modulated signal driven on sensor electrode 305. Guarding can reduce the effect of coupling capacitances between electrodes in the input device that may increase noise and limit the ability of the input device to identify a location of an input object. The outer electrode 315 can either be driven with a substantially constant voltage (C.V.) (e.g., ground, etc.) or remain electrically floating. Example B is similar to Example A except that modulated signal ABS is driven on sensor electrode 310 while electrode 305 is guarded. In this example, the sensor module measures the change in capacitance between sensor electrode 310 and the input object.

In Examples C and D, instead of transmitting the guarding signal on either electrode 305 or 310, these electrodes are left electrically floating. This may be advantageous when the coupling capacitances between sensor electrodes 305 and 310 are not large enough to affect performance.

Example F differs from the previous examples in that the modulated signal ABS is driven on both the sensor electrodes 305 and 310. In one embodiment, the sensor module may use two independent connections to sensor electrodes 305 and 310 to drive the ABS signal onto the electrodes 305 and 310 in parallel. Alternatively, the portion 400 may include an additional electrical connection between the electrodes 305 and 310 that electrically connects the two sensor electrodes 305 and 310. This electrical connection may provide an conductive path that bypasses the insulative spacer 325 that typically electrical insulates the two sensor electrodes 305 and 310. The sensor module may activate a switch that controls this electrical connection so that whatever signal is driven on one of the sensor electrodes is driven onto the other. In this scenario, the sensor module may drive the modulated signal onto one of the sensor electrodes (e.g., electrode 310) and rely on the electrical connection between the sensor electrodes to drive the modulated signal onto the other electrode (e.g., electrode 305). Regardless how the modulated signal is transmitted to both sensor electrodes 305, 310, in Example F the two sensor electrodes 305 and 310 are effectively combined into a larger sensor electrode.

In one embodiment, absolute capacitance sensing may be further divided into two different modes: touch sensing and hover detection. As used herein, touch detecting is used to detect the presence of an input object at a distance from the sensitive region that is closer than a distance attributed to hovering the input device over the sensitive region. In some embodiments, when performing touch sensing using absolute capacitance sensing, it may be preferred to use a smaller electrode to conduct the modulated signal since this reduces that amount of noise that can couple into the system and, for example, cause the detection circuits in the sensor module from reaching their rail voltages. As such, the input device may be configured based on any one of Examples A-D since these embodiments use only one sensor electrode, rather than two, for conducting the modulated signal ABS. For example, the input device may be configured such that when performing absolute capacitive sensing in touch mode, the modulated signal is driven onto sensor electrode 305 while a guarding signal is driven on electrode 310 as shown in Example A. Of course, the final determination of which of the Examples A-D to use may depend on the particular implementation—e.g., size or shape of the sensor electrodes, coupling capacitances, voltages of the detection circuitry, and the like.

However, when performing absolute capacitance sensing in hover detection mode, the ability of the input device to detect an input object hovering over the portion 400 of the sensing region may be increased if a larger sensor electrode is used. As such, the input device may be preconfigured to either use the larger of the two sensor electrodes 305 and 310 to conduct the modulated signal or use the configuration shown in Example F where the sensor module drives the modulated signal onto both sensor electrodes 305 and 310. In this manner, the sensor module can change how the various signals or voltages are applied to the sensor electrodes 305, 310, and 315 depending on the current sensing mode. That is, when performing touch sensing, the input device may drive the sensor electrodes 305, 310, and 315 as shown in Example C, but when performing hover detection, the input device may drive the sensor electrodes 305, 310, and 315 as shown in Example F.

Chart 410 of FIG. 4C illustrates various examples of performing transcapacitance sensing using the sensor electrodes 305, 310, and 315 shown in portion 400. As stated above, transcapacitance sensing detects user interaction based on changes in the capacitive coupling between sensor electrodes. One of the sensor electrodes is driven using a transmitter signal while the sensor module measures a resulting signal on another sensor electrode. The sensor electrode that is driven using the transmitter signal is referred to as the transmitter electrode (shown as TX in Charts 410 and 415) while the electrode used to measure the resulting signal is referred to as the receiver electrode (shown as RX in Charts 410 and 415). In Examples G and H, sensor electrode 305 is the transmitter electrode while sensor electrode 310 is the receiver electrode, or vice versa. This means the sensor module drives the transmitter signal onto electrode 305 while measuring the resulting signal on electrode 310, or vice versa. During this time, the sensor electrode 315 is either held at a constant voltage C.V. such as ground (as shown in Example G) or is electrically floated (as shown in Example H).

Examples I and J illustrate that in one embodiment the input device may measure the change of capacitance between sensor electrode 305 and 315 rather than electrodes 305 and 310 as shown in Examples G and H. That is, the sensor module drives the transmitter signal on sensor electrode 305 and measures the resulting signal using electrode 315, or vice versa. Meanwhile, the sensor electrode 310 may be either floated (Example I) or held to a constant voltage C.V. (Example J). Examples K and L illustrate configurations where the input device measures the change of capacitance between sensor electrode 310 and 315 by driving the transmitter signal on electrode 310 and measuring the resulting signal of electrode 315 or vice versa. During this time, the sensor electrode 305 may be electrically floated or held to a constant voltage C.V.

Chart 415 of FIG. 4D illustrates performing absolute capacitive sensing and transcapacitance sensing simultaneously using the sensor electrodes within one or more capacitive pixels. In Example M, the sensor module drives the transmitter signal used for transcapacitance sensing onto sensor electrode 305 while driving the modulated signal ABS used for absolute capacitance sensing onto sensor electrode 310. In addition to driving the modulated signal ABS, the sensor module also measures the resulting signal using the sensor electrode 310. However, in another example not shown, the sensor electrode 305 could be used to drive the transmitter signal and be used to sense absolute capacitance simultaneously.

Using data processing techniques which will not be discussed here, the processing system is able to derive location data based on both absolute and transcapacitance sensing. Stated differently, the processing system separately identifies a change of capacitance between the sensor electrode 310 and the input object via the modulated signal ABS as well as a change of capacitance between the two sensor electrodes 305 and 310 based on the transmitter and resulting signals. To produce such a mixed capacitance, some or all transmitting and receiving sensor electrodes may be electrically modulated relative to each other and to system ground. This approach works because a receiving sensor electrode modulated relative to system ground may detect absolute capacitance, and can detect transcapacitive coupling to any transmitting sensor electrode(s) modulated differently from system ground and from the receiving sensor electrode.

Some embodiments distinguish the separate absolute capacitance and transcapacitance portions. In that case, two or more measurements may be taken. For example, a first measurement may be taken with the receiving sensor electrode(s) modulated in a first way and the transmitting sensor electrode(s) modulated in a second way. The first and second way may be the same or different. Then, a second measurement may be taken with the receiving sensor electrode(s) kept at the first way of modulation and the transmitting sensor electrode(s) modulated in a third way (such that the modulation of the transmitter sensor electrode(s) relative to the receiver sensor electrode(s) is changed from the second way). This change in the transmitting sensor electrode modulation may be accomplished in a myriad of ways, including but not limited to the following: changing a voltage magnitude; changing the voltage phase; switching between binary ON/OFF voltages; flipping a sign of the voltage swing from positive to negative; changing the voltage swing to be higher or lower; etc. More than two measurements may be taken by some embodiments, such as to reduce noise or to better accommodate a more complex combination of transmitting sensor electrodes. Such a multi-measurement approach enables relatively straightforward estimation of the absolute capacitance and transcapacitance contributions.

In Example N, the modulated signal is driven, and the resulting signal is measured, using sensor electrode 305 while the transmitter signal is driven onto sensor module 310. In both Examples M and N, sensor electrode 315 may either be held at a constant voltage or left electrically floating.

As shown by Examples A-N in charts 405, 410, and 415, the input device can drive the same electrode layout in the pixel 205 in different ways depending on the capacitive technique used. That is, using the same electrode layout, the input device can use the electrodes in each capacitive pixel differently depending on the capacitive sensing technique. For example, while performing absolute capacitive sensing, the input device may drive a modulated signal onto a particular sensor electrode. However, when performing absolute and transcapacitance sensing simultaneously, the input device may ground that electrode. Furthermore, the sensor electrodes in the capacitive pixels may be driven differently depending on the mode of the sensing technique—e.g., whether the input device is performing touch sensing or hover detecting using absolute capacitive sensing. Thus, the same electrode layout can be used to perform multiple capacitive sensing techniques (or combination of these techniques) as well as different modes thereof.

In one embodiment, the absolute capacitive sensing (e.g., a first mode of capacitive sensing) and transcapacitive sensing (e.g., a second mode of capacitive sensing) may occur at times that do not overlap with updating a display in the input device. In another embodiment, however, the first and/or second mode of capacitive sensing may overlap, at least partially, in time with when the display is being updated—e.g., display signals are driven to update the pixels in the display.

Figure 5:
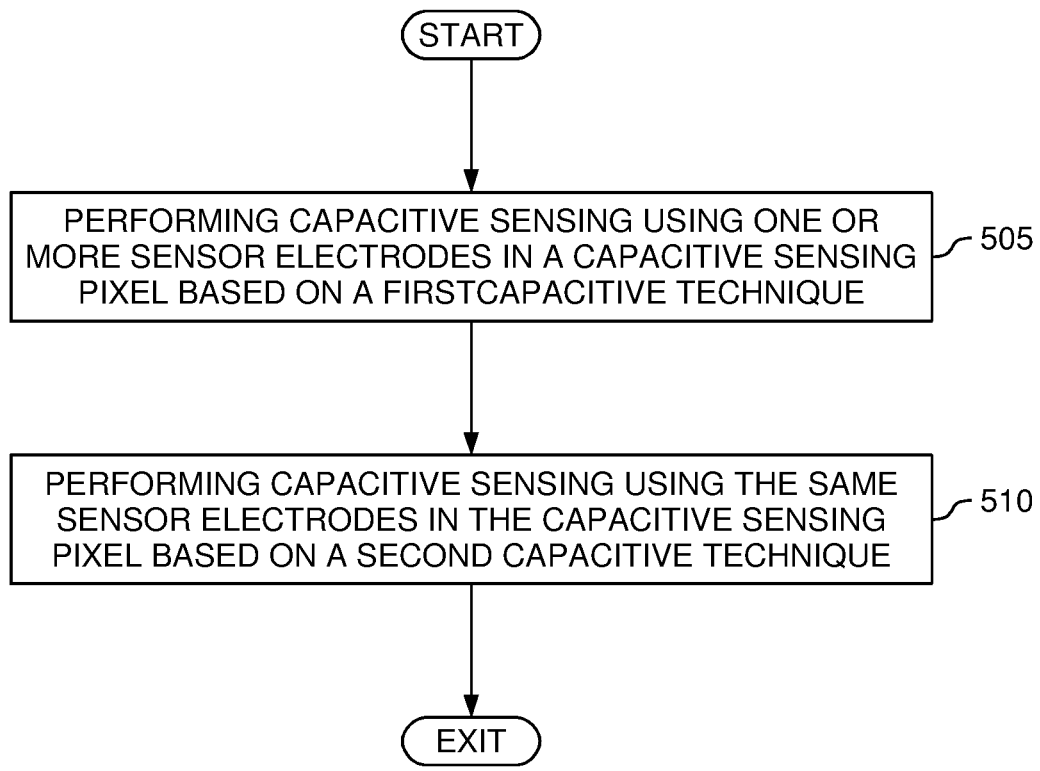
FIG. 5 illustrates a method for driving sensor electrodes in a capacitive sensing pixel using two different techniques, according to one embodiment described herein.

FIG. 5 illustrates a method 500 for driving sensor electrodes in a capacitive sensing pixel to enable two different capacitive sensing techniques, according to one embodiment described herein. At block 505, the input device performs capacitive sensing using one or more sensor electrodes in a capacitive sensing pixel based on a first capacitive sensing technique. As used herein, a "capacitive sensing technique" includes using a single sensing technique or mode (e.g., driving the sensor electrodes in the capacitive pixels to perform hover detection based on absolute capacitive sensing) or using a combination of sensing techniques simultaneously (e.g., driving the sensor electrodes such that absolute and transcapacitance sensing is performed simultaneously).

At block 510, the input device performs capacitive sensing using the same sensor electrodes but uses a second, different capacitive sensing technique. For example, during a first time period, the input device may drive the sensor electrodes in the pixels to perform touch sensing based on absolute capacitive sensing but during a second time period, the input device drives the sensor electrodes to perform transcapacitance sensing. Although method 500 illustrates using the same electrode layout for performing two different capacitive sensing techniques, the present disclosure may be used with any number of capacitive sensing techniques.

Figure 6:
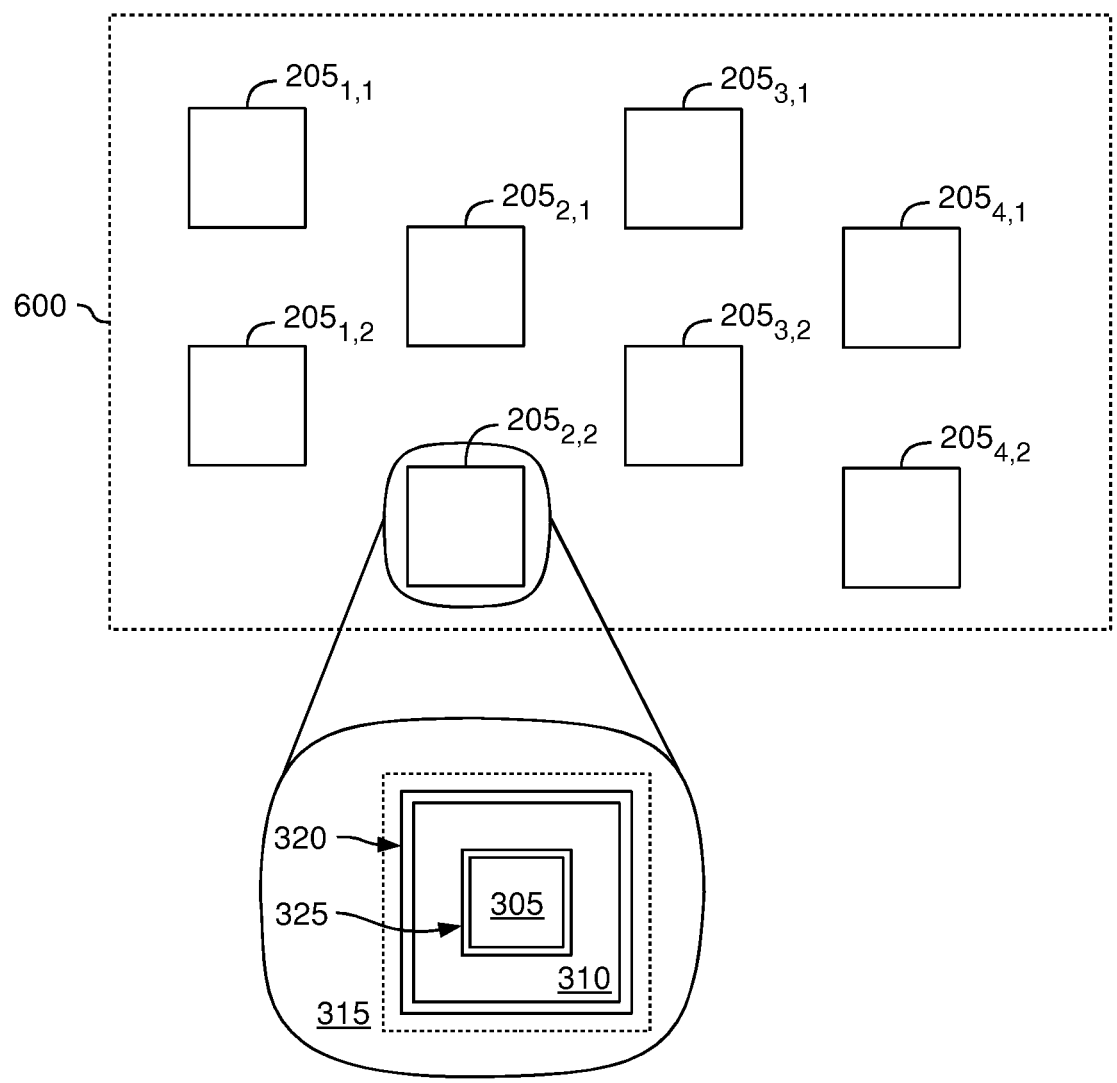
FIG. 6 illustrates a staggered arrangement of capacitive sensing pixels, according to one embodiment described herein.

FIG. 6 illustrates a staggered arrangement of capacitive sensing pixels, according to one embodiment described herein. Specifically, FIG. 6 illustrates a portion 600 of a sensing region where the capacitive pixels 205 are arranged in a grid where the boundaries of one or both of the rows and columns do not form straight lines. In one embodiment, the processing system may execute an alignment post-processing calculation to compensate for the staggered relationship shown in portion 600.

The pixels 205 in portion 600 may be spaced such that pixels 205 in adjacent columns overlap, but this is not a requirement. The pixels 205 in adjacent columns may overlap when any portion of the sensor electrodes 305 and 310 are directly between the sensor electrodes 305 and 310 in even or odd number columns. For instance, because some portion of the pixels 205 in column 2 is directly between the pixels 305 in columns 1 and 3, the pixels 205 are deemed to overlap. Moreover, although FIG. 6 illustrates staggering the pixels 205 in each row while the pixels remained aligned in the columns, the reverse is also possible or some mixture of both (i.e., the pixels in the rows and columns are staggered relative to each other).

Furthermore, the capacitive pixels 205 in different portions of the sensing region may be arranged using different patterns. For example, the pixels 205 in one half of the sensing region may be arranged in a grid pattern shown in FIG. 2 while the pixels 205 in the other half of the sensing region is arranged in a pattern shown in FIG. 6. In this manner, the sensing region may be divided into any number of portions where each portion may have a different pixel 205 arrangement.

However, although FIGS. 2 and 6 illustrate arranging the capacitive pixels 205 in a distinct pattern in the input device, this is not a requirement. Instead, the capacitive pixels 205 may be arranged with different spacings therebetween so that no pattern is formed.

FIGS. 7A-7D illustrate various shapes of capacitive sensing pixels, according to one embodiment described herein. Specifically, FIGS. 7A-7D illustrate alternative shapes of the sensor electrodes in the capacitive pixels 205 shown in FIGS. 3 and 4. FIG. 7A illustrates a star-shaped capacitive pixel 700 that includes an inner sensor electrode 705A that is electrically insulated from an outer sensor electrode 715A via a spacer region 710A where the outer electrode 715A circumscribes the inner electrode 705A. Although five points are shown, the star-shape may include any number of points.

FIG. 7B illustrates a quadrilateral capacitive pixel 720. Specifically, FIG. 7B illustrates a rhombus-shaped quadrilateral as the capacitive pixel 720. The lengths of the sides (e.g., the width dimension (W) may be less than or greater than the height dimension (H)) as well as the angle of the slant forming the quadrilateral may vary. Regardless, the outer electrode 715A circumscribes that inner electrode 705A.

FIG. 7C illustrates a cross-shaped capacitive pixel 725 with a plurality of extensions. The extensions may either all be the same length as shown, or may be of various lengths. Additionally, the pixel 725 may include more or less than the number of extensions shown. Regardless of the shape or number of the extensions, the outer electrode 715C circumscribes the inner electrode 705C. Furthermore, the pixel 725 may be rotated in any desired manner within the array of sensor electrodes.

FIG. 7D illustrates a circular or oval shaped capacitive pixel 730 where the outer electrode 715D circumscribes the inner electrode 705D. As shown here, one or more of the electrodes 705D and 715D (or a portions thereof) may be curved. In one embodiment, the curved shape shown in pixel 730 may be added to the pixels shown in FIGS. 7A-7C. For example, the electrodes 705 and 710 may have one side that is straight and another side that is curved. These curved edges may convex, concave, or some mixture of both (e.g., s-shaped). Furthermore, any of the embodiments shown in FIGS. 7A-D can be combined in any way to form different shaped capacitive pixels.

In one embodiment, the one or more of the sensor electrodes 705A-D and 715A-D are used as the sensor electrodes 305 and 310 shown in FIG. 4. As such, sensor electrodes 705A-D and 715A-D may be driven in any manner as shown by charts 405, 410, and 415. Moreover, although the grid electrode 315 is not shown in FIGS. 7A-7D, the capacitive sensing pixels in these figures may include portions of a grid electrode that extends throughout the sensing region between capacitive pixels. Moreover, the present disclosure is not limited to the shapes shown in FIGS. 7A-7D. Indeed, any electrode shape that permits an input device to use the same electrode layout to perform capacitive sensing using different sensing techniques are within the scope of this disclosure. For example, in one embodiment, the outer electrodes 715 may have a different shape than the inner electrode 705. For example, the interface between the inner electrode 705 and outer electrode 715 may include one shape (e.g., star, quadrilateral, cross-shaped, oval, etc.) while the interface between the outer electrode 715 and a grid electrode may have a different shape. For instance, using FIG. 7A as an example, the inner electrode 705A and outer electrode 715A interface at the spacer region 710A to form a star shape. However, instead of the outer electrode 715A forming a second star shaped interface with a surrounding grid electrode, it could have an oval or a square shaped interface.

Figure 8:
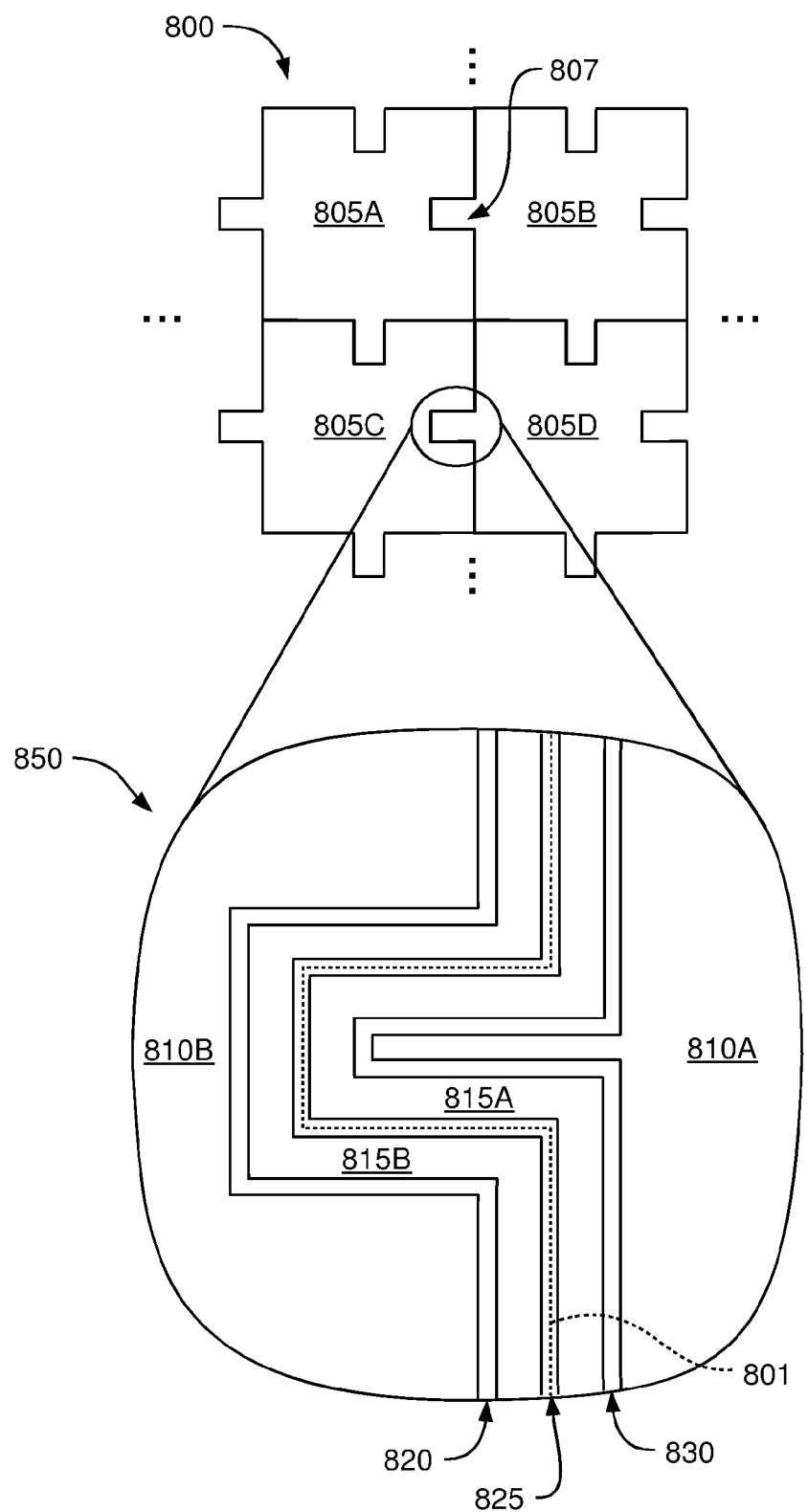
FIG. 8 illustrates interleaving the capacitive sensing pixels, according to one embodiment described herein.

FIG. 8 illustrates capacitive sensing pixels 805 that are interleaved, according to one embodiment described herein. Specifically, FIG. 8 illustrates a portion 800 of a sensing region where the boundaries of the capacitive sensing pixels 805 are interleaved. In some embodiments, detecting an input object is difficult if an input object interacts with only one capacitive sensing pixel. For example, a stylus contacting the middle of a sensor electrode of a capacitive pixel may not substantially affect the capacitance values associates with sensor electrodes in other capacitive pixels which may make the position of the stylus difficult to determine. By interleaving the boundaries or edges of adjacent capacitive pixels, the likelihood that an input object will affect the capacitance values associated with only one capacitive pixel is decreased or eliminated. State differently, the pixels may interleaved so that regardless of the position of an input object over a sensor electrodes, a sensor electrode in a neighboring capacitive pixel is affected by change of capacitance associated with the input object.

As shown here, the boundaries of adjacent capacitive sensing pixels 805 are interleaved such that at least a portion of each pixel 805 (e.g., an extension 807) is partially enclosed or surrounded by the boundary of another pixel 805. Stated differently, the pixels 805 may have boundaries that extend into adjacent rows and columns such that the edges of the adjacent pixels 805 overlap. Thus, regardless of where an input device is located within a pixel, interleaving the pixels 805 may reduce the maximum distance from the input device to a neighboring pixel 805 relative to an embodiment where the pixels are not interleaved. The pixels 805 may include any number of extensions 807 which may have any shape or size. For example, instead of one extension 807, pixel 805B may have two extensions 807 that are partially surrounded by the boundaries of pixel 805A. Furthermore, the extensions may have various sizes—e.g., one extension of pixel 805B into pixel 805A may be larger than the other—and shapes. For example, the pixels 805 may be star shaped where the extensions 807 come to a point.

A portion 850 of the pixels 805 is enlarged to illustrate in detail the boundary between adjacent capacitive sensing pixels 805. The dotted line 801 represents the boundary between the two adjacent pixels 805. The pixel 805D includes a first sensor electrode 810A where at least a portion is partially surrounded by electrodes of the adjacent pixel 805C. Pixel 805D also includes a spacer region 830 that separates the first sensor electrode 810A from a second sensor electrode 815A. These electrodes may be used as, for example, sensor electrodes 305 and 310 shown in FIG. 4, and thus, may be driven in any manner shown in charts 405, 410, and 415.

The pixels 805C and 805D are separated electrically by another spacer region 825 (if disposed on the same plane). Thus, in this embodiment, the pixels may not include a third sensor electrode (e.g., electrode 315 of FIG. 3) that runs throughout the pixels 805. Like pixel 805D, the capacitive pixel 805C includes sensor electrode 815B that is separated from sensor electrode 810B by spacer region 820. The sensor electrodes 810B and 815B may correspond to sensor electrodes 305 and 310 shown in FIG. 4 and may be driven in any manner shown in charts 405, 410, and 415. As discussed above, by extending some portion of the sensor electrodes (e.g., electrodes 810A and 815A) such that they are at least partially surrounded by electrodes in a neighboring pixel (e.g., electrodes 810B and 815B), the input device has a decreased likelihood that an input object affects the capacitance associated with one pixel 805 without also affecting the capacitance associated with a neighboring pixel 805.

The enlarged portion 850 illustrates that both sensor electrodes 810A and 815A of pixel 805D extend into pixel 805C, but this is not a requirement. For example, only sensor electrode 815A may be partially surrounded by the electrodes 815B or 810B or pixel 805C. However, if so, it may be advantageous to drive the modulating signal (when performing absolute capacitance sensing) or measure the resulting signal (when performing transcapacitance sensing) on the sensor electrode that extends into the neighboring pixel—e.g., sensor electrode 815A—to increase the chance the change of capacitance associated with the sensor electrode is affected by the input object. Thus, if electrode 815A extends into pixel 805C but sensor electrode 810A does not, the input device may be configured to drive the modulated signal onto electrode 810A while electrode 815A is used to, e.g., conduct a guarding signal or be left electrically floating.

In one embodiment, two of the sensor electrodes 810 may be on different layers (e.g., on two separate layers or on opposite sides of a common substrate). In this case, the extension may overlap in a vertical direction with another electrode. For example, sensor electrode 805A may be on a top layer of a substrate while sensor electrode 805B is disposed on a bottom layer of the same substrate. The extension 807 of sensor electrode 805B may be, at least partially, covered by the sensor electrode 805A such that some portion of extension 807 is directly below sensor electrode 805A. The opposite is also true where some portion of extension 807 covers a portion of the sensor electrode 805A assuming sensor electrode 805B is disposed on a plane above a plane that includes the sensor electrode 805A.

Figure 9:
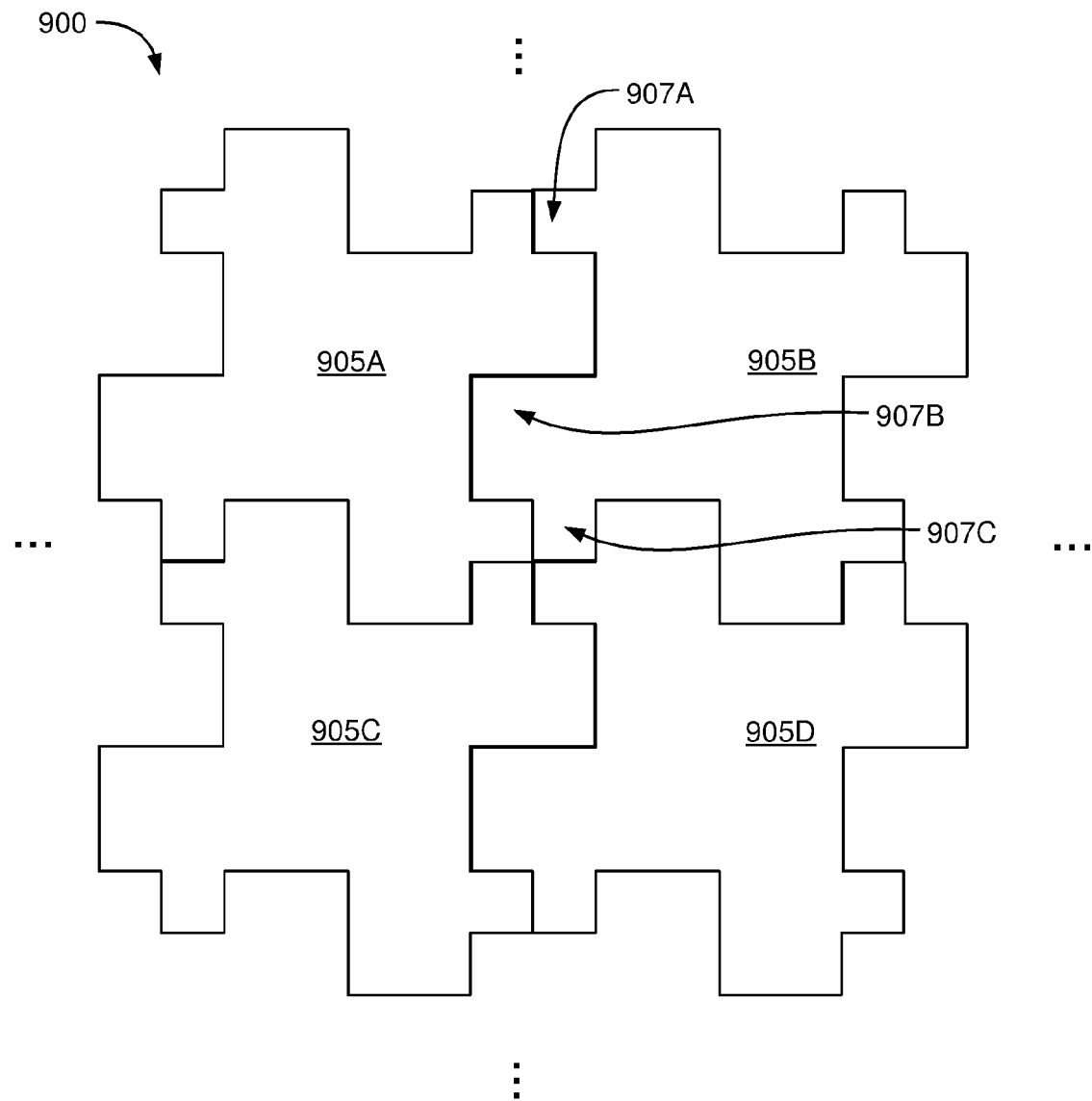
FIG. 9 illustrates interleaving the capacitive sensing pixels, according to one embodiment described herein.

FIG. 9 illustrates interleaved capacitive sensing pixels 905, according to one embodiment described herein. Specifically, FIG. 9 illustrates a portion 900 of a sensing region where capacitive sensing pixels 905 include at least two extensions 907 that extend into neighboring pixels 905. For instance, pixel 905B includes a first extension 907A and a second extension 907B that extend into neighboring pixels 905A. The first extension 907 is surrounded on two sides by pixel 905A while the second extension 907B is surrounded on three sides. Moreover, FIG. 9 illustrates that an extension 907 may be surrounded by multiple pixels. For example, extension 907C borders both pixel 905A and pixel 905C. Thus, a single extension 907 may be interleaved with multiple capacitive sensing pixels.

FIGS. 8 and 9 are intended to illustrate the principle of interleaving capacitive pixels generally. As such, the present disclosure is not intended to be limited to these illustrated examples. Any electrode extension 907 of a capacitive sensing pixel that performs the capacitive sensing techniques described herein is within the scope of this disclosure.

The embodiments and examples set forth herein were presented in order to best explain the present technology and its particular application and to thereby enable those skilled in the art to make and use the present technology. Those skilled in the art will recognize that the foregoing description and examples have been presented for the purposes of illustration and example only. The description as set forth is not intended to be exhaustive or to limit the present technology to the precise form disclosed. While the foregoing is directed to embodiments of the present invention, other and further embodiments of the invention may be devised without departing from the basic scope thereof, and the scope thereof is determined by the claims that follow.

The invention claimed is:

1. An input device comprising:
a display device;
a plurality of sensor electrodes that establish a sensing region of the input device, wherein the plurality of sensor electrodes are disposed on a same plane and form a grid, wherein the grid comprises multiple columns and rows, and wherein each column and row includes multiple capacitive sensing pixels that each includes a first sensor electrode encircled by a second sensor electrode; and
a processing system coupled to the plurality of sensor electrodes, the processing system is configured to:
perform absolute capacitive sensing during a first time period by driving, in each of the capacitive sensing pixels, a modulated signal on at least one of the first sensor electrode of the plurality of sensor electrodes and the second sensor electrode of the plurality of sensor electrodes,
perform transcapacitance sensing during a second time period by driving a transmitter signal onto the first sensor electrode and measuring a resulting signal on the second sensor electrode in each of the capacitive sensing pixels; and
determine a change in capacitive coupling between at least one of the first and second sensor electrodes and the input object in a hover detection mode and in a touch detection mode, wherein, when operating in the hover detection mode, the modulated signal is driven on the first sensor electrode and, when operating in the touch detection mode, the modulated signal is driven on the second sensor electrode.

2. The input device of claim 1, wherein a plan area of the first sensor electrode is larger than a plan area of the second sensor electrode.

3. The input device of claim 1, wherein a third sensor electrode of the plurality of sensor electrodes is disposed on the same plane and at least partially encircles both the first and second sensors.

4. The input device of claim 3, wherein, when driving the modulated signal, at least one of the first, second, and third sensor electrodes is driven with a guarding signal and at least one of the first, second and third sensor electrodes is driven with a substantially constant voltage.

5. The input device of claim 3, wherein, when performing transcapacitance sensing, the third sensor electrode is driven with one of a guarding signal and a substantially constant voltage.

6. The input device of claim 1, further comprising a display driver module configured to drive a plurality of common electrodes to update a display, wherein each of the plurality of sensor electrodes comprises at least one common electrode.

7. The input device of claim 1, wherein the first sensor electrode comprises at least one of a circular, rectangular, diamond, star, square, nonconvex, convex, nonconcave, and concave shape.

8. A method for performing capacitive sensing comprising a plurality of sensor electrodes that establish a sensing region of an input device, the method comprising:
performing absolute capacitive sensing during a first time period by driving a modulated signal on at least one of a first sensor electrode of the plurality of sensor electrodes and a second sensor electrode of the plurality of sensor electrodes to determine a change in absolute capacitance between at least one of the first and second sensor electrodes and an input object, wherein the first and second sensor electrodes are disposed on a same plane in the display device, and performing transcapacitance sensing during a second time period by driving a transmitter signal onto the first sensor electrode and measuring a resulting signal on the second sensor electrode, wherein performing absolute capacitive sensing comprises operating in at least one of a hover detection mode and a touch detection mode, wherein, when operating in the hover detection mode, the modulated signal is driven on the first sensor electrode and, when operating in the touch detection mode, the modulated signal is driven on the second sensor electrode.

9. The method of claim 8, wherein the second sensor electrode at least partially encircles the first sensor electrode within the same plane.

10. The method of claim 8, wherein a plan area of the first sensor electrode is larger than a plan area of the second sensor electrode.

11. The method of claim 8, wherein a third sensor electrode of the plurality of sensor electrodes is disposed on the same plane and at least partially encircles both the first and second sensors.

12. The method of claim 11, wherein performing absolute capacitive sensing comprises:
driving a guarding signal on at least one of the first, second, and third sensor electrodes, and
driving a substantially constant voltage on at least one of the first, second and third sensor electrodes.

13. The method of claim 11, wherein performing transcapacitance sensing comprises driving one of a guarding signal or a substantially constant voltage on the third sensor electrode.

14. The method of claim 8, wherein the plurality of sensor electrodes are disposed on the same plane in a grid that defines a plurality of individual capacitive sensing pixels arranged in rows and columns.

15. The method of claim 8, wherein performing absolute capacitive sensing comprising operating in at least one of a hover detection mode and a touch detection mode,
wherein, when operating in the hover detection mode, the modulated signal is driven on the first sensor electrode and, when operating in the touch detection mode, the modulated signal is driven on the second sensor electrode.

16. A processing system for a capacitive sensing device comprising a sensing region, the processing system comprising:
a sensor module coupled to a plurality of sensor electrodes, the sensor module configured to:
perform a first mode of capacitive sensing during a first time period by driving a modulated signal on at least one of a first sensor electrode of the plurality of sensor electrodes and a second sensor electrode of the plurality of sensor electrodes, wherein the first mode comprises determining a change in capacitive coupling between at least one of the first and second sensor electrodes and an input object in a hover detection mode and in a touch detection mode, wherein, when operating in the hover detection mode, the modulated signal is driven on the first sensor electrode and, when operating in the touch detection mode, the modulated signal is driven on the second sensor electrode, and
perform a second, different mode of capacitive sensing during a second time period using at least one of the first and second sensor,
wherein the second sensor electrode at least partially encircles the first sensor electrode.

17. The processing system of claim 16, wherein the first mode of capacitive sensing comprises determining first changes in a capacitive coupling between at least one of the first and second sensor electrodes and the input object,
wherein the second mode of capacitive sensing comprises driving the first sensor electrode and receiving with the second sensor electrode to determine second changes in capacitive coupling between the first sensor electrode and the second sensor electrode,
wherein a determining module in the processing system is configured to determine first positional information for the input object based on the first changes in the capacitive coupling and second positional information for the input object based on the second changes in the capacitive coupling.

18. The input device of claim 16, wherein the first electrode is disposed on a first plane and the second electrode is disposed on a second, different plane, wherein a third sensor electrode of the plurality of sensor electrodes at least partially encircles both the first and second sensor electrodes.

* * * * *